June 19, 1973 GURO AKASHI ET AL 3,740,266

MAGNETIC RECORDING MEDIUM

Filed Nov. 25, 1970

INVENTORS
GORO AKASHI
MASAAKI FUJIYAMA

BY

Sughrue, Rothwell, Mion, Zinn & Macpeak
ATTORNEYS

United States Patent Office 3,740,266
Patented June 19, 1973

3,740,266

MAGNETIC RECORDING MEDIUM

Goro Akashi and Masaaki Fujiyama, Kanagawa, Japan, assignors to Fuji Photo Film Co., Ltd., Kanagawa, Japan

Continuation-in-part of abandoned application Ser. No. 751,566, Aug. 9, 1968. This application Nov. 25, 1970, Ser. No. 92,879

Claims priority, application Japan, Aug. 10, 1967, 42/51,370

Int. Cl. H01f *10/02*

U.S. Cl. 117—240 6 Claims

ABSTRACT OF THE DISCLOSURE

A magnetic recording medium comprising a support and a magnetic recording layer thereon, the layer comprising a mixture of an acicular magnetic alloy which may be a Fe-Co-Ni alloy, a Fe-Co alloy, a Co-Ni alloy, or a Fe-Ni alloy, and an acicular magnetic powder such as $\gamma$-$Fe_2O_3$, Co-containing $\gamma$-$Fe_2O_3$, $CrO_2$, or $Fe_3O_4$. Either the magnetic alloy or the magnetic powder may contain either Cu, Sb, Te, Mg, B or Be. The use of the mixture prevents the aggregation of the magnetic alloy particles and minimizes the reduction in magnetic flux density caused by the addition of other materials.

CROSS-REFERENCE TO RELATED APPLICATION

This application is a continuation-in-part of U.S. application Ser. No. 751,566, filed Aug. 9, 1968, by the same inventors, now abandoned.

BACKGROUND OF THE INVENTION

Field of the invention

This invention relates to a magnetic recording medium such as an audio tape, a memory tape, a video tape, etc., and more particularly to a magnetic composition used in a magnetic recording layer of the medium.

Description of the prior art

Magnetic recording media have heretofore been composed of a synthetic resin support and a magnetic layer thereon containing a magnetic powder, such as acicular or granular $\gamma$-$Fe_2O_3$ or $Fe_3O_4$ powder, in a binder. In such a recording medium, the magnetic orientation of the magnetic powder depends on its shape. That is, acicular magnetic particles are oriented only with difficulty.

As a result of many recent studies concerning the properties of magnetic materials, it has been found that magnetic alloys having excellent magnetic induction can be used as the magnetic powder instead of the $\gamma$-$Fe_2O_3$ of the prior art.

Many magnetic alloys have excellent properties, for example, a Fe-Co-Ni type magnetic alloy has a magnetic induction of about 20,000 gauss, which is four times as great as the magnetic induction of conventional $\gamma$-$Fe_2O_3$ type magnetic material. Moreover, the coercive force of a Fe-Co-Ni alloy may be in the desirable range of 250–1000 oe. Further, these desirable magnetic properties are stable even under conditions of high temperature and high pressure.

Unfortunately, this type of magnetic alloy is relatively incompatible with the necessary binders required for forming the magnetic layer, and consequently, these alloys cannot be dispersed into the binder with good stability. Lack of stability of the dispersion invariably results in a poor magnetic field orientation.

As indicated above, although the magnetic alloy has excellent inherent properties, it has a poor magnetic field orientation, and consequently the surface property of the resultant magnetic recorder was deteriorated.

SUMMARY OF THE INVENTION

A magnetic recording composition has now been produced which provides an excellent magnetic recording medium which utilizes a combination of (a) acicular magnetic alloy powder, such as Fe-Co-Ni, Fe-Co, Co-Ni or Fe-Ni alloys and (b) an acicular magnetic powder of a magnetic oxide such as $\gamma$-$Fe_2O_3$, Co-containing $\gamma$-$Fe_2O_3$, $CrO_2$ or $Fe_3O_4$ oxides. Either the alloy or the oxide may contain Cu, Sb, Te, Mg, B or Be. According to this invention, the addition of the oxide powder to the magnetic alloy powder prevents the aggregation of the magnetic alloy particles in the coating composition and minimizes the reduction in magnetic flux density caused by the addition of other materials.

DETAILED DESCRIPTION OF THE PREFERRED EMBODIMENTS

Figure 1:
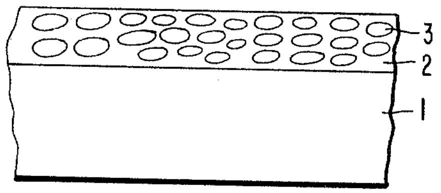
FIG. 1 is a partial sectional view of a conventional magnetic recording medium using magnetic alloy particles.
Figure 2:
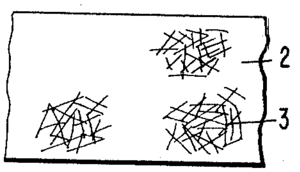
FIG. 2 is an enlarged partial view of the magnetic layer of the magnetic medium shown in FIG. 1.

As shown in FIG. 1, each magnetic alloy particle 3 is readily aggregated depending on the properties of the magnetic alloy, and the thus-aggregated magnetic alloy particles 3, in a certain size, may be distributed in a magnetic layer 2. As shown in FIG. 2, the aggregated magnetic alloy particles are formed into a collective body and do not have the proper directivity due to the close aggregation, even though the particles of the magnetic alloy are acicular.

The magnetic alloys which may be employed in the practice of the present invention include:

(1) Fe-Co-Ni alloys having a composition within the points, A, B, Fe (100% Fe) and Co (100% Co) in the following triangular molar diagram:

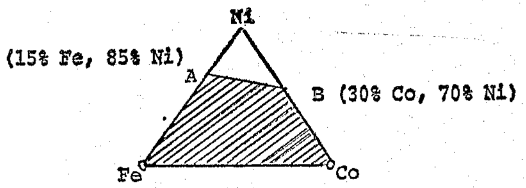

(2) Fe-Co alloys having molar ratios within any acceptable range and preferably 70–40% Fe and 30–60% Co.

(3) Co–Ni alloys having molar ratios within the range of 30–100% Co and nearly 0–70% Ni; and (4) Fe-Ni alloys having molar ratios within the range of 100–15% Fe and nearly 0–85% Ni.

Generally, any alloy meeting known criteria in the art may be utilized in the practice of the present invention.

The particle size of the alloy powder should be within the range of $0.01\mu$ to $3\mu$, and preferably from $0.05\mu$ to $0.5\mu$.

The amount of magnetic oxide to be added to the layer containing the magnetic alloy may vary from 2 to 20% by weight, based on the combined weight of the alloy powders and binder; and preferably from 2.5 to 15%.

The tye of magnetic oxide added should have a B*m* value of less than 8000 gauss/cc.

The magnetic oxide may be Co-Zn ferrite, $\gamma$-$Fe_2O_3$, Co-containing $\gamma$-$Fe_2O_3$, $CrO_2$ or $Fe_3O_4$, and the like. The oxide should be in the form of fine particles, preferably on the order of 0.1$\mu$ to 3$\mu$ in diameter.

Either the magnetic alloy or the magnetic oxide may contain a small amount, usually from 0.01% to 10% of a metal added to the alloy or oxide according to procedures well known in the art. The addition is usually performed by coprecipitation of metal ions to be added to the magnetic particle or to the raw material of the particle, e.g. a goethite particle for $\gamma$-$Fe_2O_3$, and iron-cobalt oxalate for an iron-cobalt, alloy, or electrolytic coprecipitation. For example, the following indicates several known methods of obtaining heterogeneous metal-containing materials.

Magnetic oxides such as $\gamma$-$Fe_2O_3$ and $Fe_3O_4$ can be modified by any of the above metals. For example, U.S. Pat. No. 2,694,656 discloses the requirements or conditions for producing oxidized goethite and British Pat. No. 717,269 discloses a method of manufacturing powder particles.

The following patents disclose the adding of various modifier metals to various magnetic oxides:

| Patent | Magnetic oxide | Remarks |
|---|---|---|
| 1. British Pat. No. 717,269. | Oxidized iron | Contains less than 25% of a modifier. |
| 2. U.S.P. No. 3,117,933 | $\gamma$-$Fe_2O_3$ | Method disclosed. |
| 3. U.S.P. Nos. 3,245,062 and 3,031,341. | Magnetite | Discloses examples of "x" in $Co_xFe_{3\cdot(x)}O_4$. |
| 4. Japanese publication No. 34/8,035. | Oxidized iron | Discloses addition of 7.5–10% of Co or Cr plus 3–5% of Cu, Ni, Mg, Zn, Ti and Pb. |
| 5. Japanese publication No. 28/2,773. | $\gamma$-$Fe_2O_3$ | Addition of Cu or Mg. |
| 6. Japanese publication No. 38/10,074. | $\gamma$-$Fe_2O_3$ | Adding 20–47% CuO. |
| 7. U.S.P. No. 2,885,365 | $CrO_2$ | Doping with 0.008–4% of Ru. |
| 8. U.S.P. No. 2,923,683 | $CrO_2$ | Doping with 0.05–25% of Sb. |
| 9. U.S.P. No. 2,923,684 | $CrO_2$ | Doping with 0.4–5.0% of Sn. |
| 10. U.S.P. No. 2,923,685 | $CrO_2$ | Doping with 0.03–1.0% of an alkali metal. |
| 11. U.S.P. No. 3,034,988 | $CrO_2$ | Doping with 0.1–14.0% of a metal of an atomic number of 22–28 (Ti, V, Cr, Mn, Fe, Co, Ni) plus 0.1–14.0% of N, P, As, Sb, Bi, V, Nb and Ta as a second modifier. |
| 12. U.S.P. No. 3,068,176 | $CrO_2$ | Adding 0.1–5% F and 0–14.0% of any one of Fe, Sb, Co, Ni, Mn, V, Ru and alkali metals. |
| 13. U.S.P. No. 3,243,260 | $CrO_2$ | Adding Te (1–6%). |

U.S. Pat. No. 2,956,955 discloses a suitable method for producing the $CrO_2$ by reacting $CrO_3$ and water at a high temperature and pressure; in addition, U.S. Pat. No. 3,278,263 discloses oxidizing a Cr (III) compound at high temperatures and pressures to produce $CrO_2$.

With respect to the magnetic alloys employed in the present invention, containing the added metal, the following known compositions may be illustrated:

Japan Pub. No. 36/11,412: material reducing Fe-Co compound containing more than 40 more percent of Co.

Japan Pub. No. 36/22,230: alloy powder of less than 40% Ni, less than 10% Cu, the remainder being Fe in a length of 3$\mu$.

Japan Pub. No. 37/11,520: reducing the iron compound including more than 0.5% Co at a temperature of lower than 700° C. in a magnetic field.

Japan Pub. No. 41/13,122: Fe-Cu alloy powder including 10–40 mole percent Cu.

Japan Pub. No. 42/24,032: adding an alkaline earth metal to Fe-Co-Ni alloy.

Japan Pub. No. 42/22,394: Fe-Co-Ni powder containing 10–40 mole percent of Mn, Zn, Sn, Pb.

Examples of reaction methods:

U.S.P 3,262,812: relating to the method of electrolysis-extracting a Fe-Co alloy powder at a Hg negative electrode, and a substance containing 10–80% of Co, the surface of which forms the oxidized layer.

U.S.P. 3,228,882: By decomposing Co-carbonyl in the polymer solution to obtain Co particles.

(Note.—In the "compositions" mentioned above, the powder compound such as Fe-Co is heated and reduced to obtain the alloy powder.)

From the disclosures of the aforementioned patents, it is apparent that other metals may be added and that one of ordinary skill in the art would be able to select these additional materials according to the desired results.

The binder which may be employed in the practice of the present invention may be any known synthetic resin or natural material which is known to have the necessary properties to function as a binder in magnetic recording media. For example, the following may be illustrated: a vinyl chloride-vinyl acetate copolymer, a polyamide resin, a silicone resin, an epoxy resin, a polyurethane resin, a melamine resin, a polyisocyanate resin, a vinylidene chloride-acrylonitrile copolymer, a methacrylate-containing copolymer, an amino resin, a nitrocellulose, a polyvinyl butyral resin, a butadiene-acrylonitrile copolymer, butadiene rubber and nitrile rubber, and mixtures thereof.

Any suitable support may be employed, such as polyethylene terephthalate, a polyvinyl chloride resin, polycarbonate, di- or tri-acetyl cellulose, and an aluminum plate.

The amount of the magnetic alloy and the magnetic oxide added to the binder varies from 150 to 600% and 2 to 180%, by weight, respectively, based on the weight of the binder; and preferably from 200 to 400% and 10 to 120%, respectively.

The present invention will now be explained in further detail by reference to the following non-limiting examples:

EXAMPLE 1

| | | |
|---|---|---|
| Fe-Co-Ni magnetic alloy (Fe:Co:Ni=67:28:5 by mole ratio) | g | 100 |
| Vinyl chloride-vinyl acetate copolymer (vinyl chloride:vinyl acetate 87:13 by mole ratio, as a binder) | g | 28 |
| Dibutyl phthalate (as a plasticizer) | g | 9 |
| Castor oil (as a lubricant) | g | 1 |
| $\gamma$-$Fe_2O_3$ (acicular particles) | parts | 0–30 |

Various amounts (Including a comparative example, in the case of 0).

Figure 3:
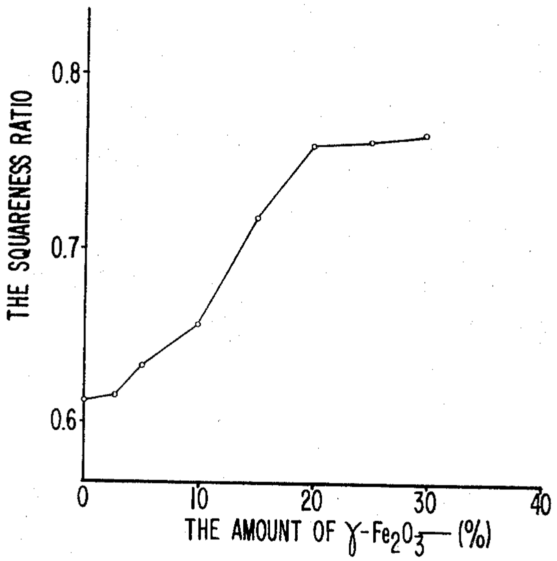
FIG. 3 is a diagram which shows the relationship between the squareness ratio (axis of ordinate: Br/Bm value) and the amount of $\gamma$-$Fe_2O_3$ magnetic powder added to the magnetic alloy powder (axis of abscissa: percent by weight)

The above-described Fe-Co-Ni magnetic alloy is mixed with certain amounts of $Fe_2O_3$ for each test, the $\gamma$-$Fe_2O_3$ particles having an average particle size of 0.87$\mu$, and a binder in the amounts as described above. 180 g. of amyl acetate, as a solvent for dispersing the $\gamma$-$Fe_2O_3$ into the binder, was added thereto. The mixture was dispersed in a ball mill and was then applied to a polyethylene terephthalate film support having a thickness of 25$\mu$, such that the thickness of the mixture after drying was 12$\mu$. A magnetic field orientation treatment was conducted before drying by passing the material through a direct 1000 gauss magnetic field. The film was then dried to obtain a magnetic recording tape. In order to estimate the magnetic characteristics, especially the magnetic field orientation of the resultant tape, the relationship between the quantity of $\gamma$-$Fe_2O_3$ added and the squareness ratio of the B–H curve is shown in FIG. 3, employing a $Br/Bm$ value. In FIG. 3, the abscissa represents the ratio of $\gamma$-$Fe_2O_3$ powder to the magnetic alloy powder (percent by weight) and the ordinate represents the squareness ratio of the magnetic medium prepared by each mixing ratio.

It is clear from FIG. 3 that the squareness ratio increases rapidly when 2–3% of $\gamma$-$Fe_2O_3$ is added and becomes saturated when 20% of $\gamma$-$Fe_2O_3$, based on the alloy powder, is added.

Figure 4:
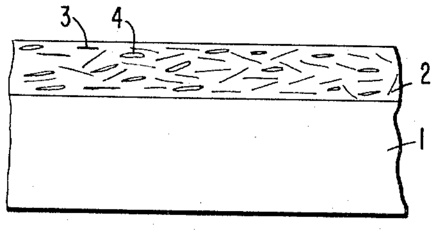
FIG. 4 is a partial sectional view of a magnetic recording medium which uses the combination of the presest invention.

Such an effect is probably due to the fact that the $\gamma$-$Fe_2O_3$ particles 4 of FIG. 4 are dispersed between the magnetic alloy particles 3 such that aggregation between the magnetic alloy particles is prevented.

EXAMPLE 2

| | | |
|---|---|---|
| Fe-Co-Cu magnetic alloy (Fe:Co:Cu=65:30:5 by mole ratio) | g.. | 100 |
| Vinyl chloride-vinyl acetate co-polymer (as described in Ex. 1, as a binder) | g.. | 27 |
| Dibutyl phthalate (as a plasticizer | g.. | 8 |
| Castor oil (as a lubricant) | gr.. | 1 |
| $CrO_2$ (acicular particles) | gr.. | 30 |

After mixing the Fe-Co-Cu magnetic alloy, the acicular $CrO_2$ particles having an average particle size of 0.4μ and the binder in the amounts described above, a suitable amount (180 g.) of a solvent (amyl acetate) was added thereto. The mixture was then dispersed in a ball mill and was applied to a polyethylene terephthalate film support having a thickness of 25μ, such that the thickness of the mixture after drying is 12μ. The magnetic field orientation treatment was then carried out by passing the materal through a direct magnetic field of 1000 gauss before drying. The film was thereafter dried and a magnetic recording tape was thereby obtained.

*Br/Bm* (the squareness ratio) of the resulting tape was determined by the same procedure as in Example 1. The resulting value was 0.75, by which it was recognized that $CrO_2$ particles have nearly the same effect on the alloy as in Example 1.

EXAMPLE 3

| | Gr. |
|---|---|
| Fe-Co magnetic alloy (Fe:Co=65:35 by mole ratio) | 100 |
| Cellulose nitrate (as a binder) | 30 |
| Dibutyl phthalate as (a binder) | 9 |
| Castor oil (as a lubricant) | 1 |
| Magnetic material ($\gamma$-$Fe_2O_3$, acicular powder) | 30 |

The above Fe-Co magnetic alloy was dispersed in a ball mill with the above ingredients with a suitable amount (180 g.) of a solvent (amyl acetate). The mixture was then applied to a support of polyethylene terephthalate having a thickness of 25μ. Then, a magnetic field orientation treatment was carried out by passing the material through a direct magnetic field of 1000 gauss before drying. Upon drying, a magnetic recording tape was obtained. The type of magnetic material used in this example and the squareness ratios (*Br/Bm*) of the resulting tapes were as follows: (1) acicular $\gamma$-$Fe_2O_3$ including 2% of Co, 0.763; (2) granular $\gamma$-$Fe_2O_3$ including 4% Co, 0.757; (3) $CrO_2$ magnetic material, 0.738; (4) Co-Zn ferrite particles, 0.750.

In this example, the average particle size of the acicular particles in the magnetic alloy was 0.5–0.9μ. Although the particle size of the added magnetic material does not alone effect the characteristics of the magnetic medium, particle sizes of less than 5μ are preferable since they have a significant effect on the surface properties.

The finely-divided magnetic oxide powder as shown herein can be used to prevent the aggregation of magnetic alloy particles when the finely divided oxide particles are added thereto and can further be used to reduce the loss of magnetic induction per unit volume which often occurs upon the addition of other magnetic materials. Therefore, the scope of this invention comprises a magnetic medium which is characterized by a reduced magnetic induction per unit volume than that of a magnetic alloy alone and, further, one which is characterized by a superior magnetic field orientation. It is preferable that the B*m* value of the magnetic oxide powder added be less than 8000 gauss/cc. If the B*m* value is larger than 8000 gauss, it approaches the B*m* value of a Fe-Ni-Co alloy and the unique effects of this invention disappear.

What is claimed is:

1. A magnetic recording medium comprising a support having therein a magnetic recording layer consisting essentially of a mixture of an acicular magnetizable alloy powder and from 2 to 20% by weight, based on the combined weight of said magnetizable alloy powder and binder, of an acicular magnetizable oxide powder, dispersed in a film-forming resinous binder, said magnetizable alloy powder having a particle size of from 0.01 to 3 microns, said alloy being selected from the group consisting of Fe-Co-Ni alloys having a composition within the area defined by the following points on a molar triangular diagram: (100% Fe), (15% Fe, 85% Ni), (30% Co, 30% Ni) and (100% Co), Fe-Co alloys containing from 40 to 70 molar percent Fe and from 30 to 60 molar percent Co, Co-Ni alloys having from 30 to 100 mole percent Co and nearly 0 to 70 mole percent Ni and Fe-Ni alloys having from 15 to 100 mole percent Fe and from nearly 0 to 85 mole percent Ni, said oxide being selected from the group consisting of gamma-$Fe_2O_3$, Co-containing gamma-$Fe_2O_3$, $CrO_2$, Co-Zn ferrite, and $Fe_3O_4$.

2. The magnetic recording medium of claim 1 wherein said alloy contains from 0.01 to 10%, by weight, based on the weight of alloy, of an element selected from the group consisting of Co, Cu, Sb, Te, Mg, B and Be.

3. The magnetic recording medium of claim 1 wherein said oxide contains from 0.01 to 10%, by weight, based on the weight of oxide, of an element selected from the group consisting of Co, Cu, Sb, Te, Mg, B and Be.

4. The magnetic recording medium of claim 1 wherein the particle size of said alloy powder varies from 0.01 to 3 microns.

5. The magnetic recording medium of claim 1 wherein said oxide powder is in the form of fine particles having a diameter of from 0.1 to 3 microns.

6. The magnetic recording medium of claim 1 wherein the amount of said alloy powder and said oxide powder in said magnetic recording layer varies from 150 to 600% by weight and 2 to 180%, by weight, based on the weight of binder in said magnetic recording layer.

References Cited

UNITED STATES PATENTS

| | | | |
|---|---|---|---|
| 3,389,014 | 6/1968 | Akashi et al. | 117—238 |
| 2,923,683 | 2/1960 | Ingraham et al. | 252—62.54 X |
| 3,242,005 | 3/1966 | Morita et al. | 117—160 |
| 2,956,955 | 10/1960 | Arthur | 252—62.5 |
| 3,034,988 | 5/1962 | Ingraham et al. | 252—62.51 |
| 3,243,260 | 3/1966 | Kubota et al. | 252—62.51 X |
| 2,923,684 | 2/1960 | Ingraham | 252—62.54 X |
| 2,923,685 | 2/1960 | Swoboda | 117—144 X |
| 2,885,365 | 5/1959 | Oppegard | 252—62.54 X |
| 3,262,812 | 7/1966 | Falk | 117—145 X |
| 3,031,341 | 4/1962 | Eschenfelder | 117—237 X |

WILLIAM D. MARTIN, Primary Examiner

B. D. PIANALTO, Assistant Examiner

U.S. Cl. X.R.

17—235; 252—62.54